No. 654,483. Patented July 24, 1900.
C. W. NEFF.
BICYCLE HANDLE BAR.
(Application filed July 1, 1899.)

(No Model.)

WITNESSES:
Franck L. Ourand.
Jos. L. Coombs

INVENTOR:
Charles W. Neff.
BY
Louis Bagger & Co.
ATTORNEYS.

UNITED STATES PATENT OFFICE.

CHARLES W. NEFF, OF CHEROKEE, IOWA.

BICYCLE HANDLE-BAR.

SPECIFICATION forming part of Letters Patent No. 654,483, dated July 24, 1900.

Application filed July 1, 1899. Serial No. 722,583. (No model.)

*To all whom it may concern:*

Be it known that I, CHARLES W. NEFF, a citizen of the United States, residing at Cherokee, in the county of Cherokee and State of Iowa, have invented new and useful Improvements in Bicycle Handle-Bars, of which the following is a specification.

My invention relates to the handle-bars of bicycles; and its object is to provide a yielding connection between the same and the steering-bar whereby the jars or concussions caused by the bicycle traveling over rough or uneven roads will be absorbed or taken up by said connection and not be transmitted to the handle-bar.

The invention consists in the novel construction and combination of parts hereinafter fully described and claimed.

Figure 1:
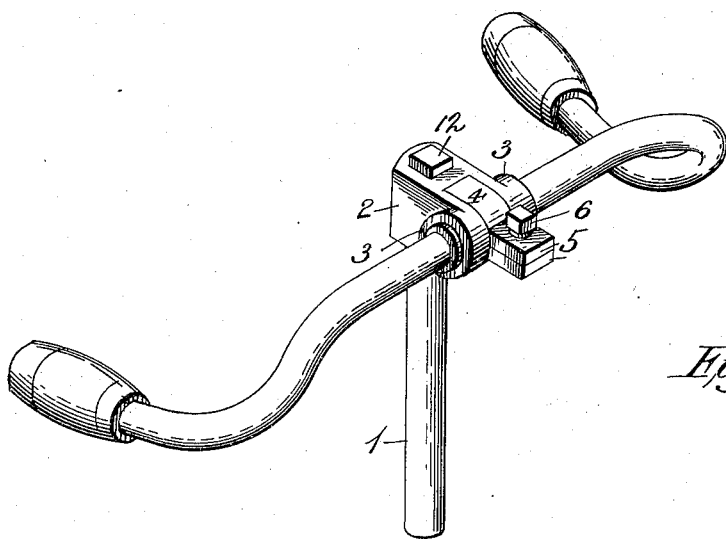
Figure 2:
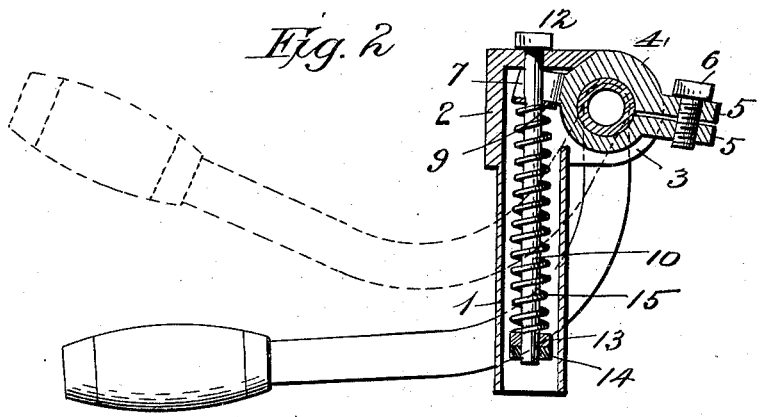
Figure 3:
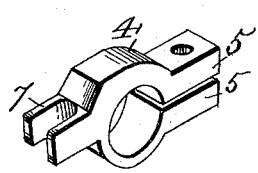

In the accompanying drawings, Figure 1 is a perspective view of a bicycle handle-bar constructed in accordance with my invention. Fig. 2 is a central longitudinal section of the same. Fig. 3 is a perspective view of the block or clamping-collar.

In the said drawings the reference-numeral 1 designates a short tube adapted to be connected with the upper end of the steering-bar of a bicycle of any ordinary or suitable construction. Formed at the upper end of this tube is a head 2, having an opening in one side and formed with two forwardly-extending lugs 3, between which works a block 4, formed with a split shoulder 5 at the front end, through which passes a binding-screw 6. Said block and lugs are formed with alined holes or openings, and the block is securely clamped to the handle-bar by means of the shoulder and screw. The said handle-bar may be of any ordinary or suitable construction. Formed at the rear side of the said block is a toe 7, which projects through the opening in the head 2 and bears upon a collar 9, loosely carried by a screw-rod 10, provided with a head 12. This rod passes through an opening in the head 2 and extends down into the said tube and near its lower end is provided with another loose collar 13 and a nut 14, which fits on the screw-threaded lower end of the rod. Surrounding this rod is a coiled spring 15, the ends of which bear against the said collars.

In practice when the bicycle is traveling over rough or uneven roads the jars or concussions caused by said unevenness or roughness will be absorbed or taken up by the spring and prevented from being transmitted to the handle-bar, and the comfort of the rider will be enhanced. The tension of the spring can be regulated by the nut at the lower end of the screw-rod.

Having thus fully described my invention, what I claim is—

The combination of a steering-post tube having a bearing for the handle-bar at its upper end, a block or collar seated between lugs on the bearing and provided with a binding-screw to hold the handle-bar in place, said block or collar having a bifurcated toe or projection extending into the bearing, a rod suspended from the bearing, extending downward into the tube out of contact therewith and having a spring surrounding it, a washer surrounding the rod and resting on top of the spring to form a seat for the bifurcated toe on opposite sides of the rod, the lower free end of said rod having a nut to support the lower end of the spring and to regulate the tension or resiliency thereof, substantially as described.

In testimony whereof I have hereunto set my hand in presence of two subscribing witnesses.

CHARLES W. NEFF.

Witnesses:
J. I. LAMONT,
F. J. STANOSHECK.